US008157236B2

(12) United States Patent
Sun

(10) Patent No.: US 8,157,236 B2
(45) Date of Patent: Apr. 17, 2012

(54) COMBINATIONAL TRANSVERSE STRUT FOR A TWO-IN-ONE ARC-SHAPED OR LINEAR ADVERTISEMENT DISPLAY FRAME

(76) Inventor: Xiaoqiu Sun, Changzhou (CN)

( * ) Notice: Subject to any disclaimer, the term of this patent is extended or adjusted under 35 U.S.C. 154(b) by 369 days.

(21) Appl. No.: 12/475,237

(22) Filed: May 29, 2009

(65) Prior Publication Data

US 2010/0115812 A1 May 13, 2010

(30) Foreign Application Priority Data

Nov. 11, 2008 (CN) ...................... 2008 2 0178374 U

(51) Int. Cl.

| | |
|---|---|
| ***A47B 91/00*** | (2006.01) |
| ***A47B 97/04*** | (2006.01) |
| ***A47B 97/06*** | (2006.01) |
| ***A47G 29/00*** | (2006.01) |
| ***A47G 1/17*** | (2006.01) |
| ***B65D 19/00*** | (2006.01) |
| ***F16M 11/00*** | (2006.01) |
| ***G09F 7/00*** | (2006.01) |
| ***G09F 17/00*** | (2006.01) |

(52) U.S. Cl. ................ 248/346.03; 248/689; 248/447.2; 248/225.11; 248/223.41; 248/309.4; 248/298.1; 248/239; 248/205.1; 40/611.02; 40/611.03; 40/611.04; 40/606.12

(58) Field of Classification Search ............. 248/346.03, 248/345, 689, 447.2, 101, 250, 225.11, 244, 248/223.41, 309.4, 298.1, 239, 205.1, 441.1, 248/460, 462; 40/611.02–611.04, 603–604, 40/606.12; 211/119.003, 90.02, 135

See application file for complete search history.

(56) References Cited

U.S. PATENT DOCUMENTS

| | | | | | |
|---|---|---|---|---|---|
| 3,707,271 | A | * | 12/1972 | Sanchez et al. | 248/101 |
| D375,045 | S | * | 10/1996 | Weber et al. | D9/443 |
| 6,474,009 | B2 | * | 11/2002 | Hahn | 40/658 |
| 6,643,966 | B2 | * | 11/2003 | Schmitt | 40/610 |
| 7,337,567 | B2 | * | 3/2008 | Fritsche et al. | 40/603 |
| 7,963,059 | B2 | * | 6/2011 | Fritsche et al. | 40/603 |

FOREIGN PATENT DOCUMENTS

| | | |
|---|---|---|
| CN | 201060610 Y | 5/2008 |
| CN | 201084364 Y | 7/2008 |

* cited by examiner

*Primary Examiner* — Terrell McKinnon
*Assistant Examiner* — Christopher Garft
(74) *Attorney, Agent, or Firm* — Schwabe, Williamson & Wyatt, P.C.

(57) ABSTRACT

A combinational transverse strut for a two-in-one arc-shaped or linear advertisement display frame, comprising a base body and a bendable overlay plate. Support members are provided at both ends of base body and overlay plate, respectively, each comprising a support seat, a support cap, a crankpin, and a magnetic steel. The crankpin is operatively connected between, and the magnetic steel is fixed between, the support seat and the support cap. The support member is connected to the base body by a straight pin shaft, and connected to the overlay plate by the crankpin. The two ends of the overlay plate are set up via support members to form an arc shape, so as to achieve applications as a linear member and as an arc-shaped member. The combinational transverse struts are attracted to each other by the magnetism of the support members.

8 Claims, 11 Drawing Sheets

COMBINATIONAL TRANSVERSE STRUT FOR A TWO-IN-ONE ARC-SHAPED OR LINEAR ADVERTISEMENT DISPLAY FRAME

TECHNICAL FIELD

This invention relates to an advertisement display frame.

BACKGROUND ART

An advertisement display frame is generally composed of an upper transverse strut, and lower transverse strut and an upright support, with an image being arranged between the upper and lower transverse struts. There are various kinds of transverse struts. Chinese utility model patent No. 200720038995.6, titled "transverse struts for an advertisement display frame", discloses a combinational transverse strut which comprises a base with a bendable cover plate arranged thereon, wherein the cover plate is connected to the base at their middle portions, one of the base and the cover plate is operatively connected with support members at its both ends, and at least a spring clip is provided between the cover plate and the base, and is located between each support member and a fixed point. In the combinational transverse struts, the cover plate is arranged on the base, and the cover plate is bendable. When the cover plate is closed, the transverse struts assume a linear state, and hence the image setup by the transverse struts is flat. When the cover plate is opened, i.e., when its two ends are setup, the cover plate assumes an arc-shape, and hence the image setup by the transverse struts appear in an arc-shape under the effect of the cover plate. The combinational transverse struts of this kind may render the image flat, or render it in an arc-shape. Chinese utility model patent No. 200720043668.X, titled "a two-in-one arc-shaped or linear advertisement display frame", discloses a solution in which a lower transverse strut is another kind of combinational transverse strut, i.e., a base so-called easy-to-set piece. This transverse strut comprises a scrolling cylinder which has a base body and a bendable overlay plate located in front of the base body. The base body is fixedly connected to the middle portion of the overlay plate. Two support members are respectively arranged between the base body and the overlay plate, and are respectively located at the two sides of the middle fixed point. The above two kinds of combinational transverse struts can be setup by support members through setting up two ends of the cover (overlay) plates such that the cover (overlay) plates assume an arc-shape, and a large arc-shaped display frame may be obtained through putting together a plurality of transverse struts. In Chinese Patent No. 200720043668.X, it is proposed that two adjacent arc-shaped overlay plates of two transverse struts are connected therebetween via inserts. The two transverse struts are connected by means of inserting the two ends of the insert into the positioning grooves of the two adjacent overlay plates. Nevertheless, this connection is not secure, and in practice applications, operation of fixing the inserts onto the overlay plate through screws is inconvenient. Furthermore, the inserts are small and separate parts, which are inconvenient to storage and hence are likely to miss. Furthermore, when two ends of the overlay (cover) plate is set up, it is necessary to insert a finger into the space between the base body (base) and the overlay (cover) plate so as to set up the support member, hence leading to a troublesome operation since the space is limited.

SUMMARY

The object of the invention is to provide a combinational transverse strut for a two-in-one arc-shaped or linear advertisement display frame, which facilitates connection to a combinational transverse strut of the same kind.

The invention employs the following technical solution to achieve this object.

The invention comprises a base body and a bendable overlay plate, wherein the base body is provided with a positioning groove on the surface corresponding to the overlay plate, the overlay plate is provided with a positioning groove on the surface corresponding to the base body, and the base body is fixedly connected to the overlay plate at their middle portions; two support members located between the positioning groove of the base body and the positioning groove of the overlay plate are provided at both ends of base body and the overlay plate, respectively, each support member comprising a support seat, a support cap, a crankpin, and a magnetic steel; the support cap is provided on its rear portion with an oblique groove; the crankpin is operatively connected between middle portions of the support seat and the support cap, the magnetic steel is fixed between the support seat and the support cap, and the support cap is connected to the support seat; the base body is provided with, on front surfaces at both ends thereof respectively, an indentation engaged with a boss of the support cap and the base body is provided with a pair of pin shaft holes on a side wall approximate to an end point at each of its both ends, the overlay plate is provided with a pair of pin shaft holes on a side wall at each of its both ends; and the support member is connected to the base body by means of inserting a straight pin shaft into the oblique groove of the support cap and a pair of pin shaft holes on the base body, and the support member is connected to the overlay plate by means of inserting the crankpin into the pair of pin shaft holes of the overlay plate.

The support cap is provided with a wedge-shaped boss at its rear portion in such a way that the oblique groove is arranged on wedge-shaped boss and is parallel to the wedge surface.

The crankpin comprises a main body portion, two arm portions each perpendicular to the main body portion, and two end portions each perpendicular to the arm portions; the crankpin is operatively connected between the middle portions of the support seat and the support cap through the main body portion; the two arm portions are located outside of the support seat and the support cap; and the two end portions are inserted into the pair of pin shaft holes of the overlay plate.

The support seat is provided in its middle portion with an arc-shaped grooves, and the main body portion of the crankpin is seated in the arc-shaped groove of the support seat; or alternatively, the support cap is provided in its middle portion with an arc-shaped grooves, and the main body portion of the crankpin is seated in the arc-shaped groove of the support cap; or alternatively, the support seat and the support cap are respectively provided in their middle portions with arc-shaped grooves, and the main body portion of the crankpin is seated in a hole formed by putting together the arc-shaped groove of the support seat and the arc-shaped groove of the support cap.

The support seat is provided on its inner wall with a front groove and a rear groove which are located on a front side and a rear side of the main body portion of the crankpin, respectively; the support cap is provided in its inner wall with a front shallow groove and a rear shallow groove corresponding to the front groove and the rear groove of the support seat, respectively; and the magnetic steel between the support seat and the support cap is designed as two pieces which are respectively fixed in a front cavity and a rear cavity, respectively formed by putting together the front groove of the support seat and the front shallow groove of the support cap and putting together the rear groove of the support seat and the rear shallow groove of the support cap.

The rear side of the support seat is formed with an opening, and the rear side of the support cap is formed with an opening, such that one end of the magnetic steel in the rear cavity is exposed to the outside.

The support seat is provided on its inner wall with a front groove and a rear groove which are located on a front side and a rear side of the main body portion of the crankpin, respectively; and the magnetic steel in the support members is designed as two pieces which are respectively fixed in the front groove and the rear groove of the support seat.

The rear side of the support seat is formed with an opening such that one end of the magnetic steel in the rear groove is exposed to the outside.

The invention has following advantages.

1. According to the invention, the two ends of the overlay plate are set up via support members to form an arc shape, so as to achieve applications as a linear member and as an arc-shaped member. Since magnetic steel is arranged on the support member and the adjacent combinational transverse struts are attracted to each other by means of the magnetic steel on the support members, the structure become simpler and connection is convenient. When the support member is opened, the overlay plate becomes an arc-shape, and the arc-shaped overlay plates of two combinational transverse struts are attracted to each other since the support seats of the two adjacent support members abut against each other. When the support member is retracted, the two combinational transverse struts are straight, and are attracted to each other since the rear ends of the two adjacent support members (i.e., the exposed ends of the magnetic steel) abut against each other. In both cases, the gaps remaining at a location of putting together are controlled to be smaller.

2. According to the invention, the support cap is provided with an oblique groove at its rear portion. An angle between the support member and the overlay plate in the state that the support member is fully opened can be adjusted through varying the angle or length of the oblique groove, and hence a smooth large arc will be achieved after putting together two overlay plates through choosing appropriate angle or length of the oblique groove.

3. According to the invention, the support member is connected between the base body and the overlay plate, thus in the retracted state, the support member is hidden between the base body and the overlay plate. Therefore, the support member is not likely to be lost and the appearance remains as it is.

4. Since the support member is located at the end points of the base body and the overlay plate, the operation room is relatively large, thus facilitating setting up the support member to a full extent via manpower.

DESCRIPTION OF FIGURES

Hereinafter, the invention will be described in further details with aid of specific embodiments and accompanying figures, in order for the invention to be more clearly and more fully understood.

EMBODIMENTS

The First Embodiment

Figure 1:
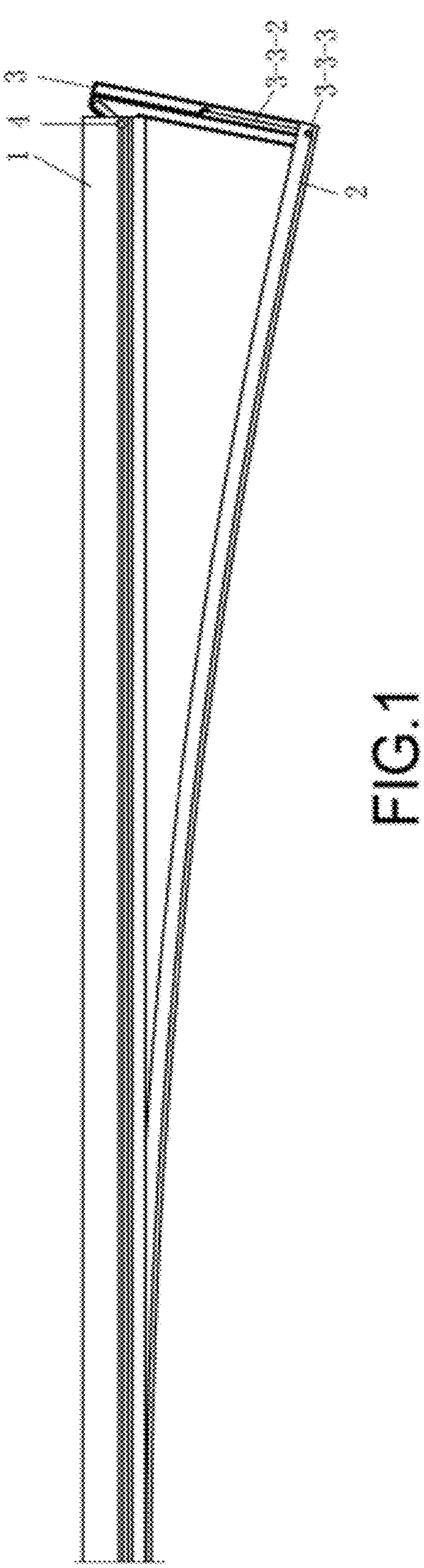
FIG. 1 is an overall view of the first embodiment in its open state.
Figure 2:
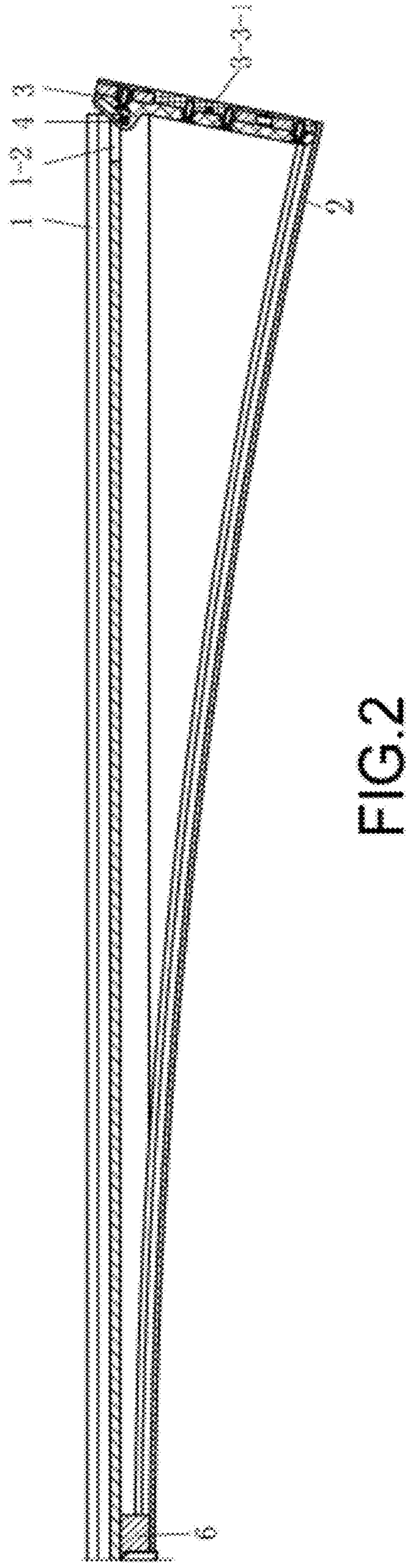
FIG. 2 is a structural view of the first embodiment.

Referring to FIGS. 1 to 10, the embodiment comprises a base body 1 and a bendable overlay plate 2. The base body 1 is provided with a positioning groove 1-1 on the surface corresponding to the overlay plate 2, and the overlay plate 2 is provided with a positioning groove 2-1 on the surface corresponding to the base body 1. Indentations 1-2 are provided on front is surfaces at both ends of the base body 1. The side walls of the base body 1, at both ends thereof, approximate to end points thereof are each provided with a pair of pin shaft hole 1-3, and the side walls of the overlay plate 2 at both ends thereof are respectively provided with a pair of pin shaft hole 2-2. A connection member 6 in a "工" shape is arranged between middle portions of the base body 1 and the overlay plate 2. Both ends of the connection member 6 are embedded into the positioning groove 1-1 of the base body 1 and the positioning groove 2-1 of the overlay plate 2, respectively, and the connection member 6 is fixed thereto via screws. Two support members 3 located between the positioning groove 1-1 of the base body and the positioning groove 2-1 of the overlay plate 2 are provided at both ends of base body 1 and overlay plate 2, respectively.

Referring to FIGS. 11 to 17, the two support member 3 each comprise a support seat 3-1, a support cap 3-2, a crankpin 3-3, and a magnetic steel 3-4. The crankpin 3-3 is configured by means of bending one steel wire so as to comprise a main body portion 3-3-1, two arm portions 3-3-2 respectively perpendicular to the main body portion 3-3-1, and end portions 3-3-3 each perpendicular to arm portions 3-3-2. The support cap 3-2 is formed as a wedge-shaped boss at its rear side, and the wedge-shaped boss is provided with an oblique groove 3-2-5 parallel to the wedge surface. The indentations 1-2 on the front surface of the base body 1 are intended to engage with the wedge-shaped boss of the support cap 3-2. When the support member 3 is retracted into between the base body 1 and the overlay plate 2, the rear end surface d of the support member 3 will flush with (see FIG. 7) or be lower than the end surfaces of the base body 1 and the overlay plate 2.

The support seat 3-1 is provided with an arc-shaped groove 3-1-3 at its middle portion. The main body portion 3-3-1 of the crankpin 3-3 is located in the arc-shaped groove 3-1-3 so as to be operatively connected between the support seat 3-1 and the support cap 3-2. The two arm portions 3-3-2 of the crankpin 3-3 is located outside of the support seat 3-1 and the support cap 3-2.

The support seat 3-1 is provided on its inner wall with a front groove 3-1-1 and a rear groove 3-1-2 which are located on front side and rear side of the main body portion 3-3-1 of the crankpin, respectively. Correspondingly to the front groove 3-1-1 and the rear groove 3-1-2, the support cap 3-2 is provided on its inner wall with a front shallow groove 3-2-1 and a rear shallow groove 3-3-2. When the support seat 3-1 and the support cap 3-2 are engaged with each other, a front cavity is formed by the front groove 3-1-1 of the support seat and the front shallow groove 3-2-1 of the support cap, and a rear cavity is formed by the rear groove 3-1-2 of the support seat and the rear shallow groove 3-3-2 of the support cap. The magnetic steel 3-4 is designed as two pieces, which are respectively fixed in the front cavity and rear cavity. The rear side of the support seat 3-1 and the rear side of the support cap 3-2 are formed with openings 3-1-4 and 3-2-4, respectively, such that an end of the magnetic steel 3-4 in the rear cavity is exposed to the outside.

Figure 3:
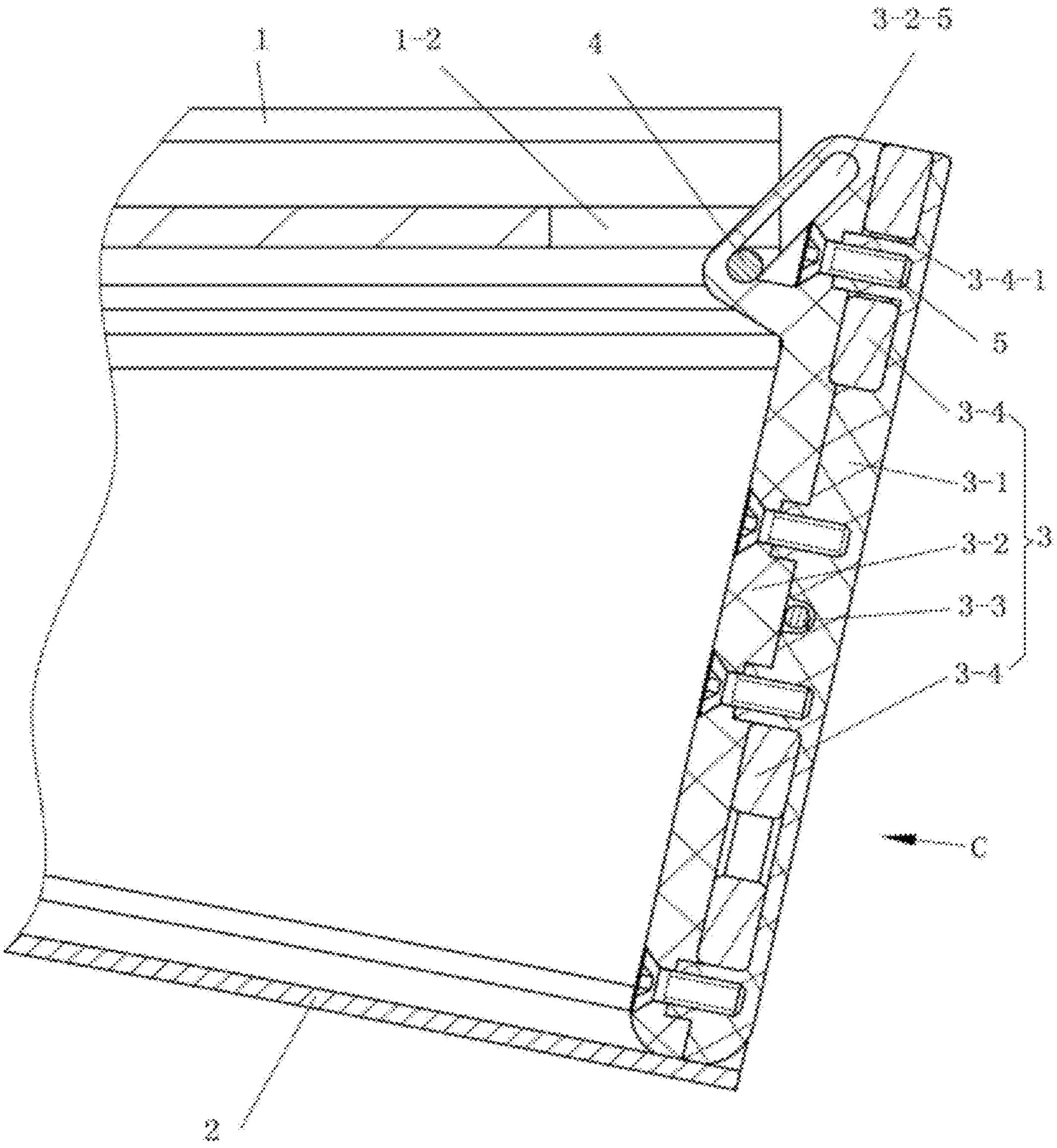
FIG. 3 is a partially enlarged view of FIG. 2.
Figure 4:
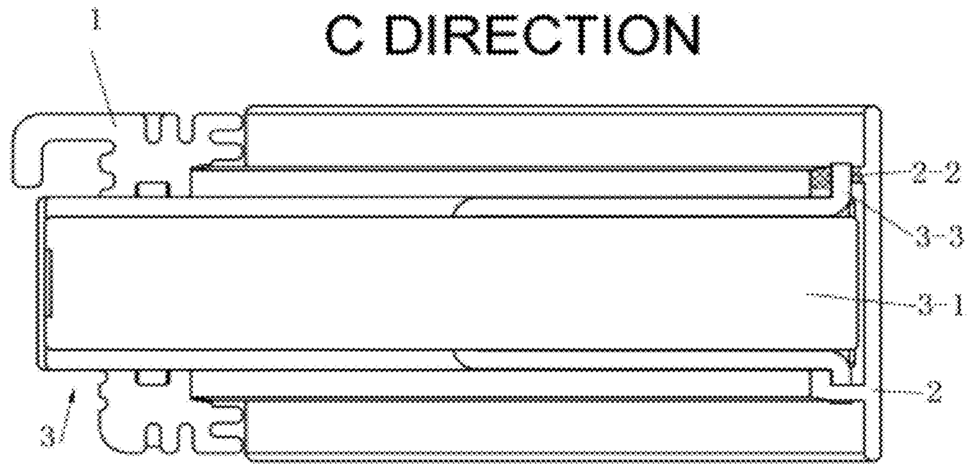
FIG. 4 is an end view of FIG. 3 viewed from C direction.
Figure 5:
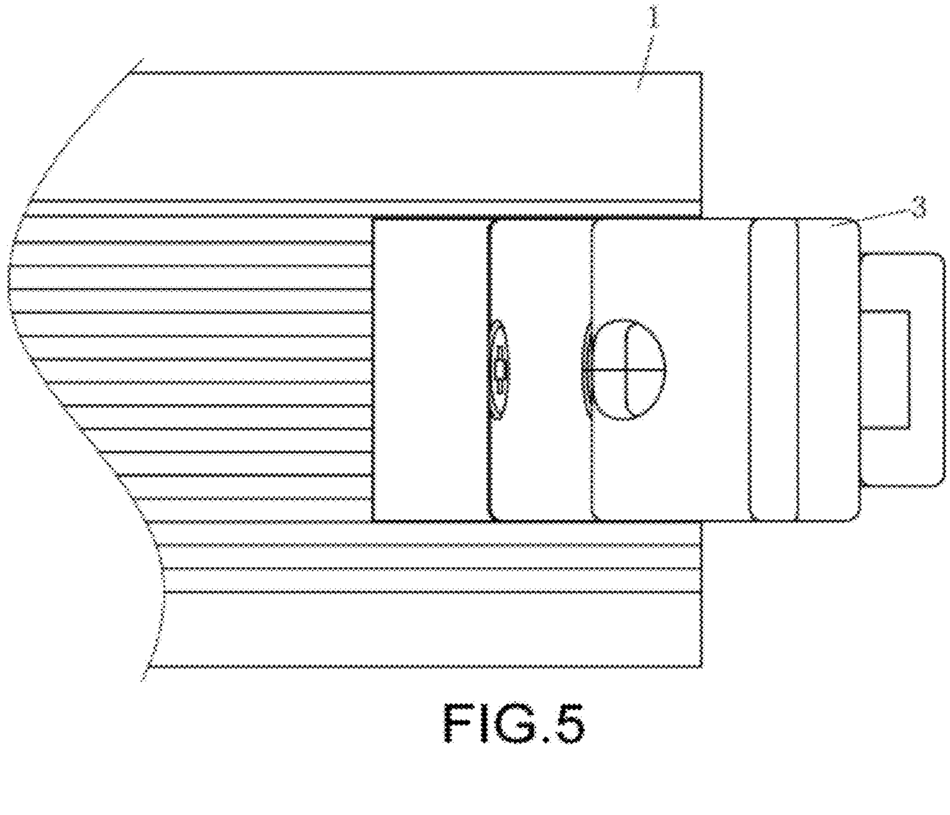
FIG. 5 is a top view of FIG. 4.

As shown in FIG. 3, the support seat 3-1 is provided on its inner wall with four protuberant columns 3-1-6 having threaded holes. The support cap 3-2 is provided with screw holes 3-2-6, which correspond to the protuberant columns 3-1-6 of the support seat. The support seat 3-1 and the support cap 3-2 are connected by means of screwing four screws 5 through corresponding screw holes 3-2-6 of the support cap into respective threaded holes of the protuberant columns 3-1-6. Since one of the protuberant columns 3-1-6 is located in the rear groove 3-1-2 of the support seat, the magnetic steel 3-4 located in the rear cavity is provided thereon with a hole 3-4-1 allowing passage of the protuberant column 3-1-6.

As shown in FIG. 3, a straight pin shaft 4 is inserted into the oblique groove 3-2-5 on the wedge-shaped boss of each support member. Both ends of the straight pin shaft 4 are inserted into a pair of pin shaft holes 1-3 of the base body 1 so as to connect the support member 3 to the base body 1. Both end portions 3-3-3 of the crankpin 3-3 of the support member 3 are inserted into a pair of corresponding pin shaft holes 2-2 on the overlay plate 2 so as to connect the support member 3 to the overlay plate 2.

Figure 6:
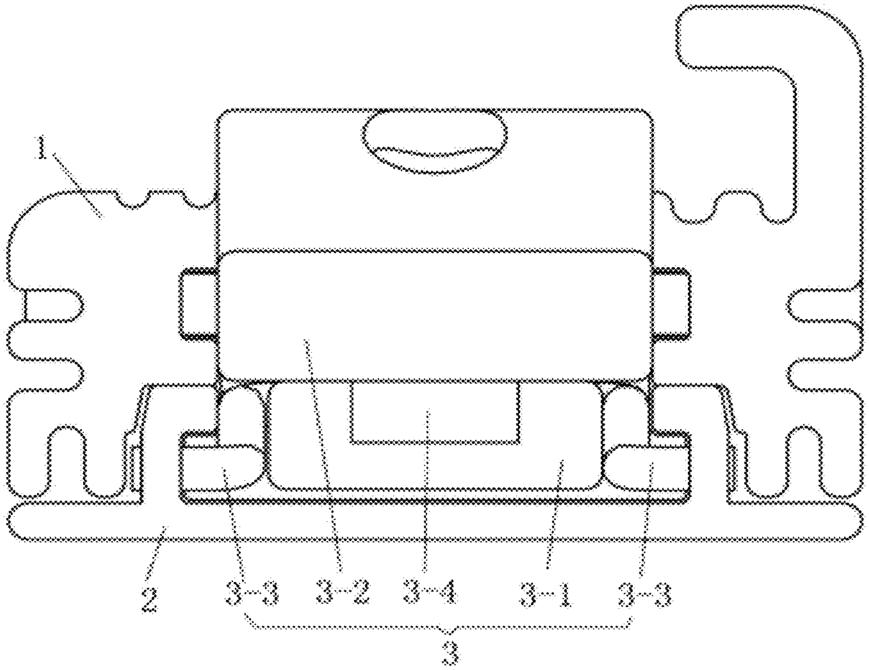
FIG. 6 is an end view showing a packing state.
Figure 7:
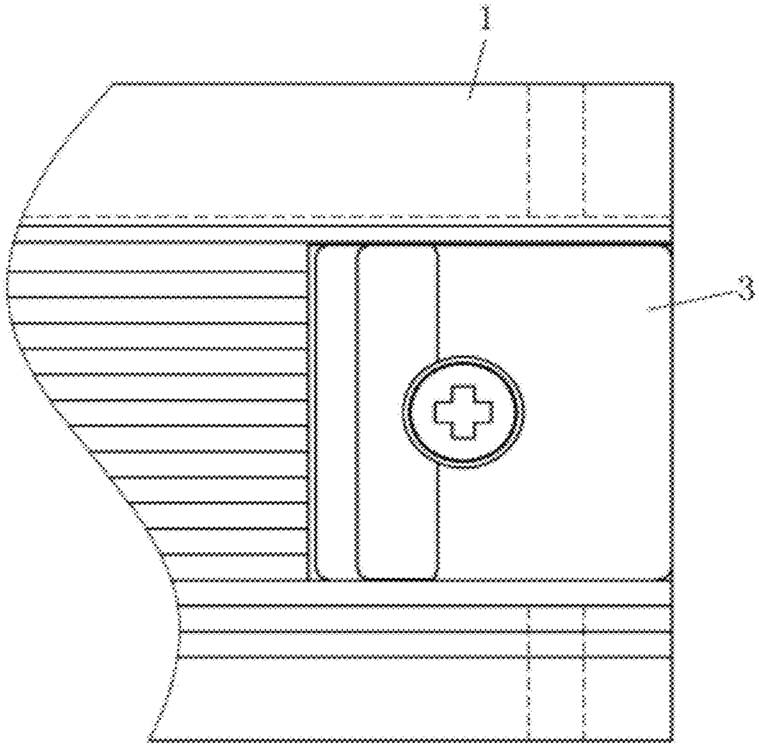
FIG. 7 is a top view of FIG. 6.
Figure 8:
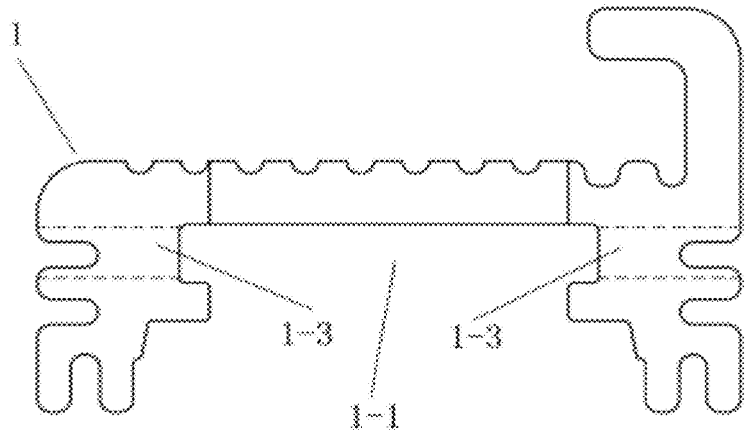
FIG. 8 is an illustrative view of the base body.
Figure 9:
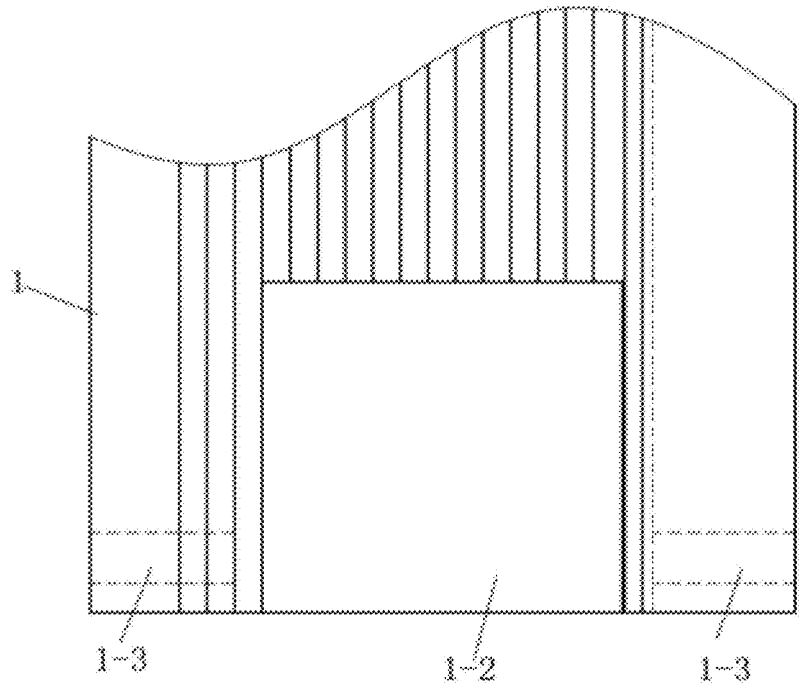
FIG. 9 is a top view of FIG. 8.
Figure 10:
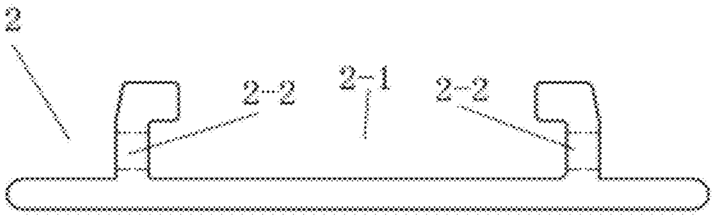
FIG. 10 shows an overlay plate.
Figure 11:
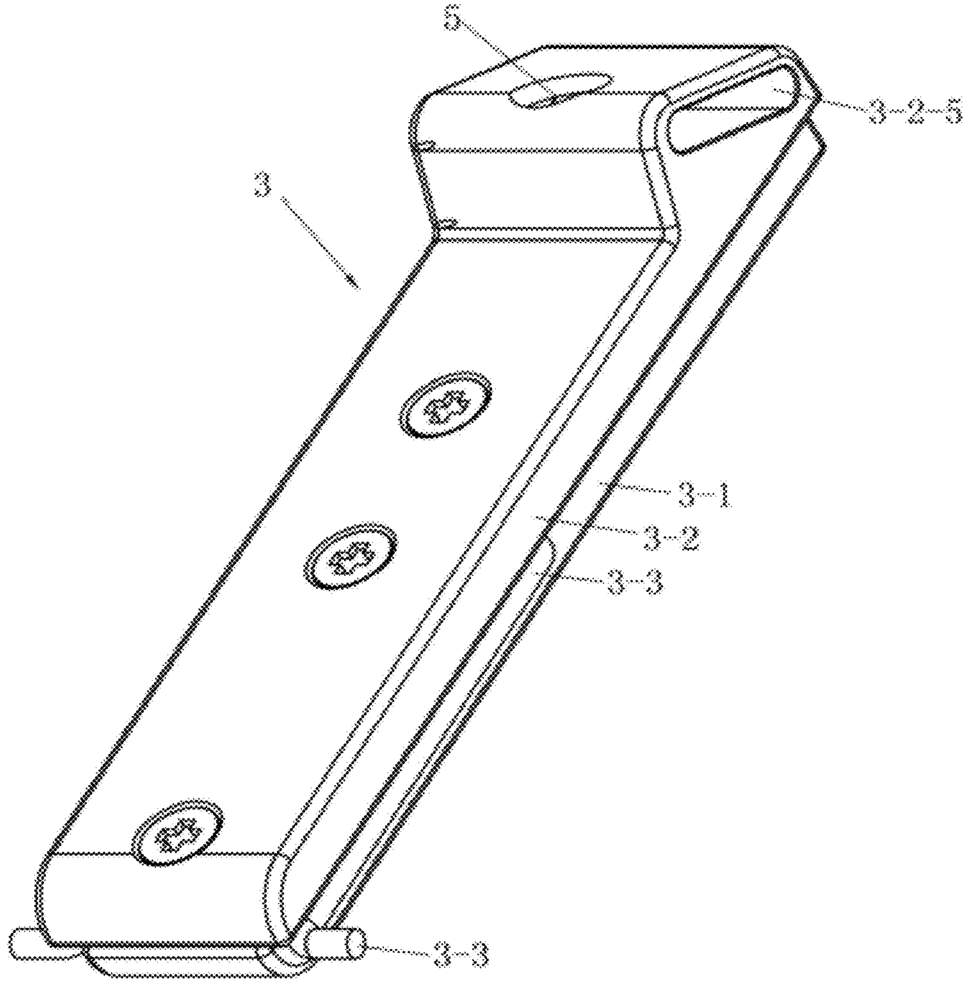
FIG. 11 is a perspective view of a support member.
Figure 12:
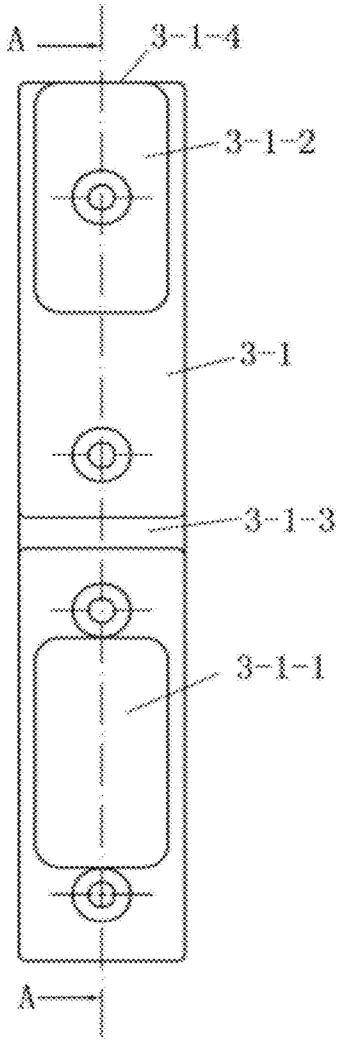
FIG. 12 shows the support seat of the support member.
Figure 13:
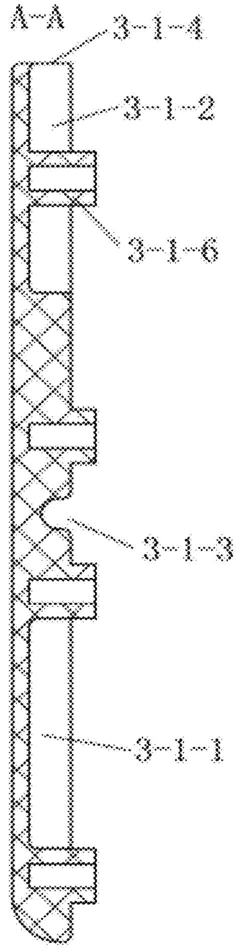
FIG. 13 is a section view along A-A line of FIG. 12.
Figure 14:
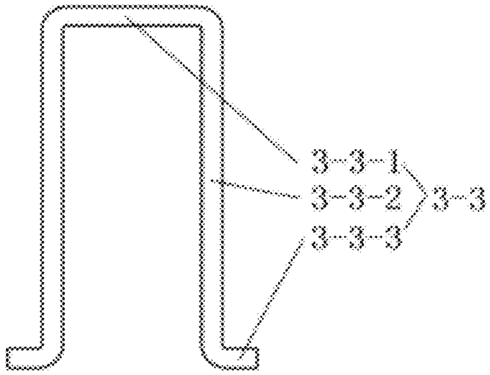
FIG. 14 shows a crankpin of the support member.
Figure 15:
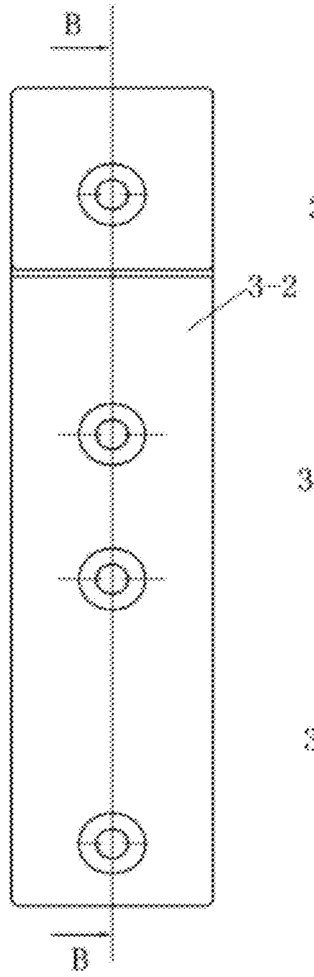
FIG. 15 is an illustrative view of the support cap of the support member.
Figure 16:
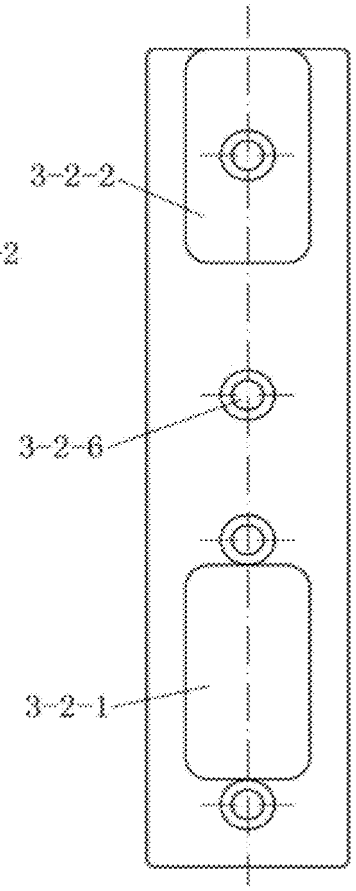
FIG. 16 is a rear view of FIG. 15.
Figure 17:
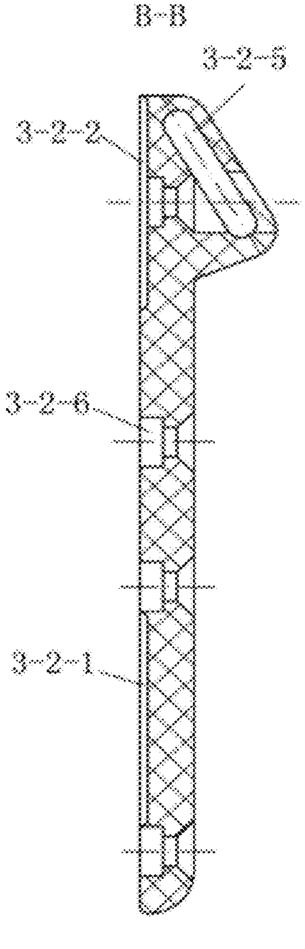
FIG. 17 is a section view along B-B line of FIG. 15.

As shown in FIGS. 6 and 7, when the support member 3 is in a retracted state, the support member 3 is seated between the positioning groove 1-1 of the base body 1 and the positioning groove 2-1 of the overlay plate 2, with the rear end d of the magnetic steel, i.e., its exposed end directing outside. In this case, the straight pin shaft 4 is located at the rearmost end of the oblique groove 3-2-5, the wedge-shaped boss of the support cap 3-2 is exactly located in the indentation 1-2, and the two arm portions 3-3-2 of the crankpin 3-3 are respectively located on both sides of rear portion of the support member 3.

As shown in FIGS. 1 and 3, during opening the support member 3 so as to set up the overlay plate 2 into an arc shape, the support member 3 rotates about the main body portion 3-3-1 of the crankpin 3-3. When the support member 3 reaches a full open state, the straight pin shaft 4 is located at the frontmost end of the oblique groove 3-2-5 of the wedge-shaped boss of the support cap; the wedge-shaped boss of the support cap 3-2 is rotated out of the indentation 1-2; and the two arm portions 3-3-2 of the crankpin is located on both sides of the front portion of the support member 3, respectively. Different choices with respect to the angle or length of the oblique groove 3-2-5 result in a different angle a between the support member 3 and the overlay plate 2. The angle or length of the oblique groove is properly chosen such that the large arc formed by putting two adjacent overlay plates together is smooth.

Figure 22:
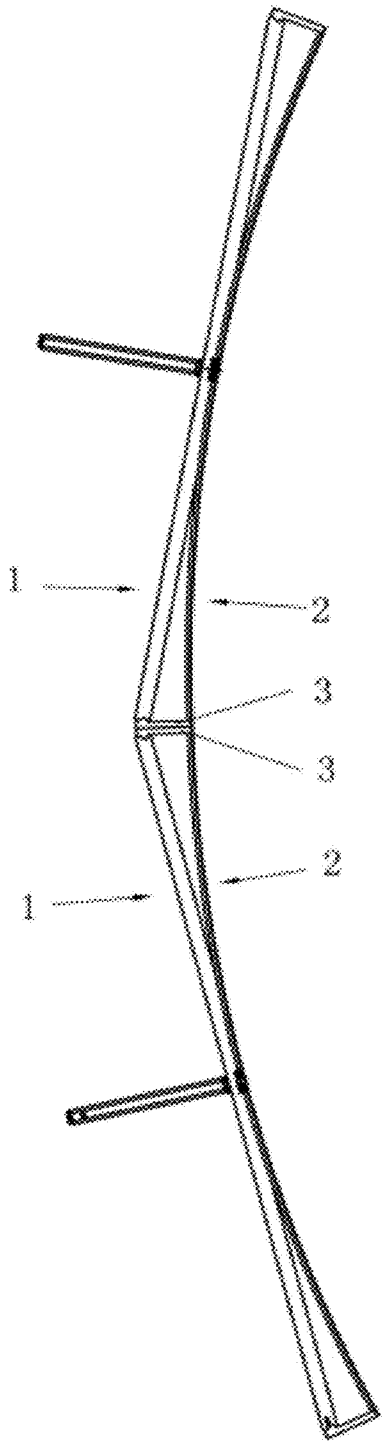
FIG. 22 shows an application.

As shown in FIG. 22, when two adjacent transverse struts with arc-shaped overlay plates are put together, the support seats 3-1 of the two support member 3 abut against and are attracted to each other.

When two adjacent transverse struts as straight struts are put together, the exposed ends (i.e., rear ends d) of the magnetic steels of the two support is members 3 abut against each other. In order to minimize the distance between the magnetic steels of the two adjacent transverse struts, the outer ends of the magnetic steel in the rear grooves are intended to expose to outside, thereby to strengthen connection between the two adjacent transverse struts.

The Second Embodiment

Figure 18:
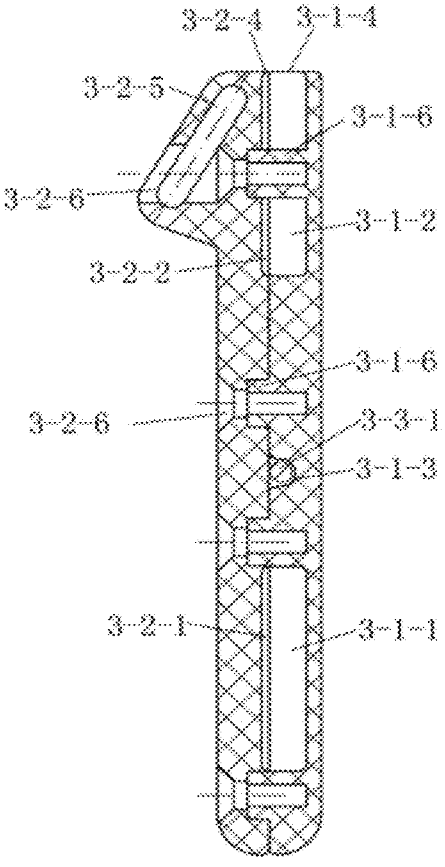
FIG. 18 is an illustrative view showing a support seat and a support cap of a second type in a fitting state.

According to this embodiment, as shown in FIG. 18, the support seat 3-1 is provided on its inner wall with a front groove 3-1-1 and a rear groove 3-1-2 which are located on front side and rear side of the main body portion 3-3-1 of the crankpin, respectively. Two magnetic steels are fixed in the front groove 3-1-1 and the rear groove 3-1-2, respectively. The support seat 3-1 and the support cap 3-2 are connected via a snap manner, with the other structures remaining the same as those in the first embodiment.

The Third Embodiment

Figure 19:
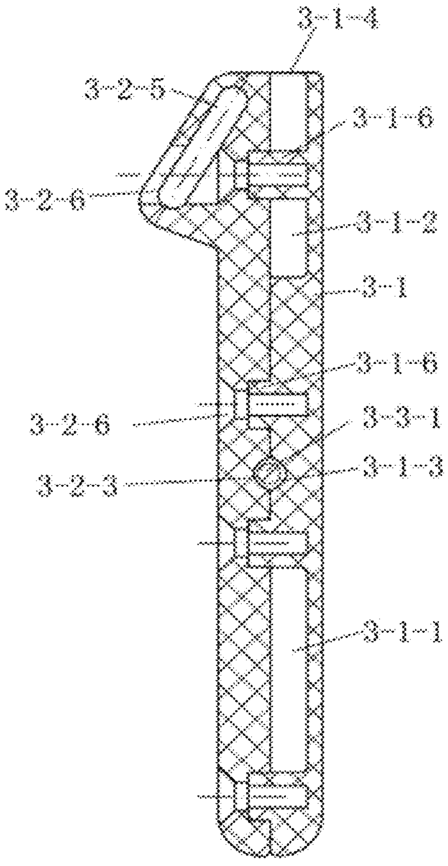
FIG. 19 is an illustrative view showing a support seat and a support cap of a third type in a fitting state.

According to this embodiment, as shown in FIG. 19, the support seat 3-1 and the support cap 3-2 are respectively provided in their middle portions with arc-shaped grooves 3-1-3 and 3-2-3. The main body portion of the crankpin 3-3 is seated in a hole formed by putting together the arc-shaped groove 3-1-3 of the support seat 3-1 and the arc-shaped groove 3-2-3 of the support cap 3-2. The support seat 3-1 is provided on its inner wall with a front groove 3-1-1 and a rear groove 3-1-2, which are located on front side and rear side of the main body portion 3-3-1 of the crankpin, respectively. Two magnetic steels 3-4 are fixed in the front groove 3-1-1 and the rear groove 3-1-2 of the support seat 3-1, respectively. The other structures remain the same as those in the first embodiment.

The Fourth Embodiment

Figure 20:
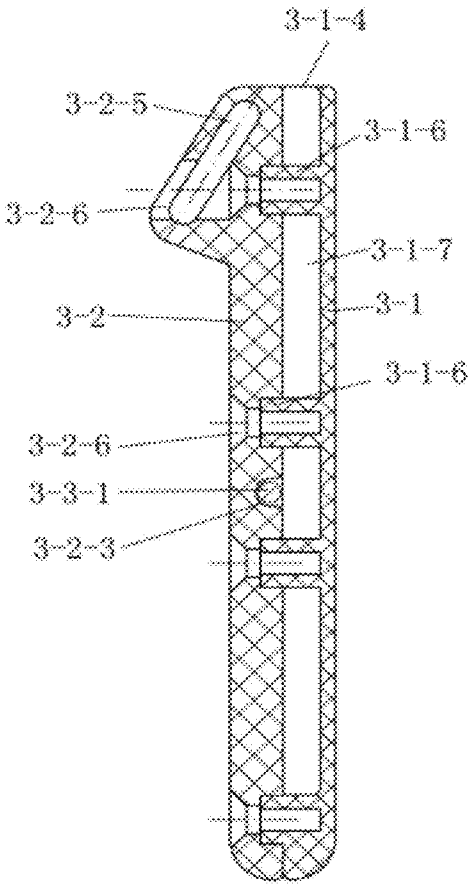
FIG. 20 is an illustrative view showing a support seat and a support cap of a fourth type in a fitting state.

According to this embodiment, as shown in FIG. 20, the support cap 3-2 is provided with arc-shaped groove at its middle portion, the main body portion of the crankpin 3-3 is seated in the arc-shaped groove 3-2-3 of the support cap 3-2. The support seat 3-1 is provided in its inner wall with a groove 3-1-7 which extends from the rear portion of the support seat 3-1 to the front portion of the seat 3-1. The magnetic steel 3-4 is in a form of a single-piece and is arranged in the integrated groove. The support seat 3-1 is provided in its inner wall with four protuberant columns 3-1-6 having threaded holes. The support cap 3-2 is provided with screw holes 3-2-6, which correspond to the protuberant columns 3-1-6 of the support seat. The support seat 3-1 and the support cap 3-2 are connected by means of screwing four screws through corresponding screw holes 3-2-6 into the thread hole of respective protuberant columns 3-1-6. Four holes are provided on the magnetic steel 3-4 in a way of corresponding to each protuberant column 3-1-6 so as to allow passage of the protuberant columns 3-1-6. The other structures remain the same as those in the first embodiment.

The Fifth Embodiment

Figure 21:
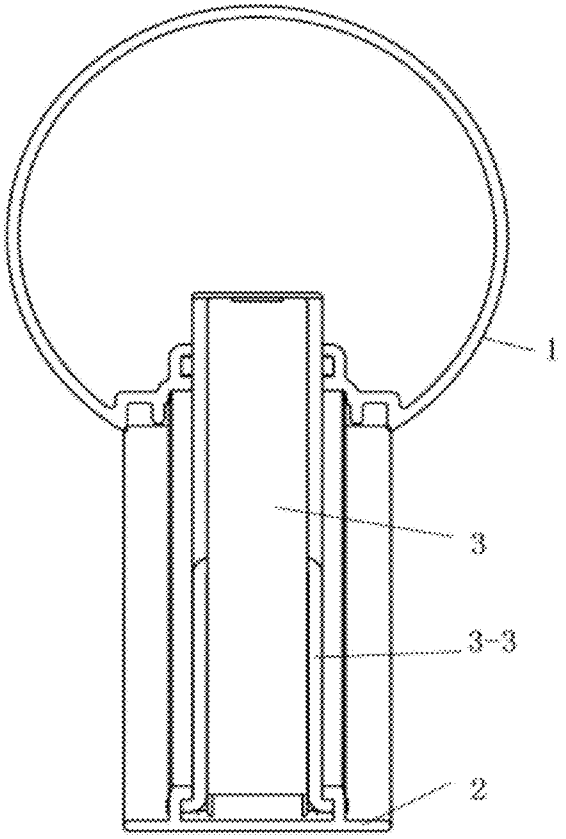
FIG. 21 is an illustrative view showing a base body, an overlay plate and a support member of another type in a fitting state.

As shown in FIG. 21, in this embodiment, the base is of an easy-to-set piece, with the shape of base body 1 different from the shape of base body 1 in the first embodiment, and other structures remaining the same as those in the first embodiment.

The above described embodiments of the invention are examples to clarify the invention, and hence are not limiting in any sense. Many variations may be made by those skilled in the art based on the above description. For example, the magnetic steel may be designed as more than 2 pieces. These obvious variations as inspired by the spirit of the invention fall within the scope of the invention.

What is claimed is:

1. A combinational transverse strut for a two-in-one arc-shaped or linear advertisement display frame, comprising a base body (1) and a bendable overlay plate (2), both the base body and overlay plate comprising two ends and a middle portion respectively, wherein the base body (1) is provided with a positioning groove (1-1) on a surface corresponding to the overlay plate (2), the overlay plate (2) is provided with a positioning groove (2-1) on a surface corresponding to the base body (1), and the base body (1) is fixedly connected to the overlay plate (2) at their middle portions, characterized in that, two support members (3) located between the positioning groove (1-1) of the base body and the positioning groove (2-1) of the overlay plate (2) are provided at both ends of the base body (1) and the overlay plate (2), respectively, each of the two support members (3) comprising a support seat (3-1), a support cap (3-2), a crankpin (3-3), and a magnetic steel (3-4); the support cap (3-2) is provided on its rear portion with an oblique groove (3-2-5); the crankpin (3-3) is operatively connected between middle portions of the support seat (3-1) and the support cap (3-2), the magnetic steel (3-4) is fixed between the support seat (3-1) and the support cap (3-2), and the support cap (3-2) is connected to the support seat (3-1); the base body (1) is provided with a pair of pin shaft holes (1-3) on a side wall approximate to an end point at each of its ends, and the overlay plate (2) is provided with a pair of pin shaft holes (2-2) on a side wall at each of its ends; and the support member (3) is connected to the base body (1) by means of inserting a straight pin shaft (4) into the oblique groove (3-2-5) of the support cap and the pair of pin shaft holes (1-3) on the base body (1), and the support member (3) is connected to the overlay plate (2) by means of inserting the crankpin (3-3) into the pair of pin shaft holes (2-2) of the overlay plate (2).

2. The combinational transverse strut for a two-in-one arc-shaped or linear advertisement display frame according to claim 1, characterized in that, the support cap (3-2) is provided with a wedge-shaped boss at a rear portion in such a way that the oblique groove (3-2-5) is arranged on the wedge-shaped boss and is parallel to a wedge surface; and indentations (1-2) engaged with the boss of the support cap are respectively provided on front surfaces of both ends of the base (1).

3. The combinational transverse strut for a two-in-one arc-shaped or linear advertisement display frame according to claim 1, characterized in that, the crankpin (3-3) comprises a main body portion (3-3-1), two arm portions (3-3-2) each perpendicular to the main body portion (3-3-1), and two end portions (3-3-3) each perpendicular to the arm portions (3-3-2); the crankpin (3-3) is operatively connected between middle portions of the support seat (3-1) and the the support cap (3-2) through the main body portion (3-3-1); the two arm portions (3-3-2) are located outside of the support seat (3-1) and the support cap (3-2); and the two end portions (3-3-3) are inserted into the pair of pin shaft holes (2-2) of the overlay plate (2).

4. The combinational transverse strut for a two-in-one arc-shaped or linear advertisement display frame according to claim 3, characterized in that, the support seat (3-1) is provided in a middle portion with an arc-shaped grooves (3-1-3), and the main body portion (3-3-1) of the crankpin (3-3) is seated in the arc-shaped groove (3-1-3) of the support seat (3-1); or alternatively, the support cap (3-2) is provided in its middle portion with an arc-shaped grooves (3-2-3), and the main body portion (3-3-1) of the crankpin (3-3) is seated in the arc-shaped groove (3-2-3) of the support cap (3-2); or alternatively, the support seat (3-1) and the support cap (3-2) are respectively provided in their middle portions with arc-shaped grooves (3-1-3, 3-2-3), and the main body portion (3-3-1) of the crankpin (3-3) is seated in a hole formed by putting together the arc-shaped groove (3-1-3) of the support seat (3-1) and the arc-shaped groove (3-2-3) of the support cap (3-2).

5. The combinational transverse strut for a two-in-one arc-shaped or linear advertisement display frame according to claim 3, characterized in that, the support seat (3-1) is provided on an inner wall with a front groove (3-1-1) and a rear groove (3-1-2) which are located on a front side and a rear side of the main body portion (3-3-1) of the crankpin, respectively; the support cap (3-2) is provided in an inner wall with a front shallow groove (3-2-1) and a rear shallow groove (3-3-2) corresponding to the front groove (3-1-1) and the rear groove (3-1-2) of the support seat (3-1), respectively; and the magnetic steel is designed as two pieces which are respectively fixed in a front cavity and a rear cavity, respectively formed by putting together the front groove (3-1-1) of the support seat and the front shallow groove (3-2-1) of the support cap and putting together the rear groove (3-1-2) of the support seat and the rear shallow groove (3-2-2) of the support cap.

6. The combinational transverse strut for a two-in-one arc-shaped or linear advertisement display frame according to claim 5, characterized in that, a rear side of the support seat (3-1) is formed with an opening (3-1-4), and a rear side of the support cap (3-2) is formed with an opening (3-2-4), such that one end of the magnetic steel (3-4) in the rear cavity is exposed to the outside.

7. The combinational transverse strut for a two-in-one arc-shaped or linear advertisement display frame according to claim 3, characterized in that, the support seat (3-1) is provided on an inner wall with a front groove (3-1-1) and a rear groove (3-1-2) which are located on a front side and a rear side of the main body portion (3-3-1) of the crankpin, respectively; and the magnetic steel (3-4) in the support member (3) is design as two pieces which are respectively fixed in the front groove (3-1-1) and the rear groove (3-1-2) of the support seat (3-1).

8. The combinational transverse strut for a two-in-one arc-shaped or linear advertisement display frame according to claim 6, characterized in that, a rear side of the support seat (3-1) is formed with an opening (3-1-4) such that one end of the magnetic steel (3-4) in the rear groove (3-1-2) is exposed to the outside.

* * * * *